(12) United States Patent
Fürst et al.

(10) Patent No.: US 6,616,313 B2
(45) Date of Patent: *Sep. 9, 2003

(54) LIGHTING DEVICE FOR MOTOR VEHICLES

(75) Inventors: Peter Fürst, Bürgstadt (DE); Harald Buchalla, Amorbach (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/013,194

(22) Filed: Dec. 6, 2001

(65) Prior Publication Data

US 2002/0041498 A1 Apr. 11, 2002

Related U.S. Application Data (63) Continuation of application No. 09/670,211, filed on Sep. 25, 2000, which is a continuation of application No. 09/249,979, filed on Feb. 12, 1999, now Pat. No. 6,152,590.

(30) Foreign Application Priority Data

Feb. 13, 1998 (DE) .......................... 198 05 771
May 20, 1998 (DE) ...................... 298 11 417 U (51) Int. Cl.$^7$ .................................................. B60Q 1/26
(52) U.S. Cl. ...................... 362/494; 362/540; 362/544; 362/545; 362/546; 362/249
(58) Field of Search ............................... 362/545, 494, 362/249, 540, 544, 546

(56) References Cited

U.S. PATENT DOCUMENTS 6,152,590 A  * 11/2000 Furst et al. ................. 362/545

* cited by examiner

Primary Examiner—Sandra O'Shea
Assistant Examiner—Bertrand Zeade
(74) Attorney, Agent, or Firm—McGlew and Tuttle, P.C.

(57) ABSTRACT

A lighting device for attachment to a motor vehicle inside a housing 4. One or more light emitting diodes 9 which emit substantially white light are employed as lighting emitters. On account of the small amount of waste heat of the light-emitting diodes 9 the lighting device can be particularly easily integrated into existing subassemblies of the motor vehicle, in particular into the outside mirrors, inside mirror, trim strips and door handles, and can serve to illuminate the region around the vehicle or the interior of the vehicle.

124 Claims, 2 Drawing Sheets

LIGHTING DEVICE FOR MOTOR VEHICLES

FIELD OF THE INVENTION

The invention relates to a lighting device for motor vehicles which is electrical and attaches with a housing to the vehicle. This application is a continuation of Ser. No. 09/670,211 filed Sep. 25, 2000, which is a continuation of Ser. No. 09/249,979 filed Feb. 12, 1999 now U.S. Pat. No. 6,152,590.

BACKGROUND OF THE INVENTION

Lighting devices of this type are arranged in the interior and exterior regions of motor vehicles and serve as interior lighting, reading lamps and lamps which are arranged in the region of the doors and which illuminate the ground around the vehicle in darkness in order to enhance the safety and the comfort of the users of the vehicle in the process of entry. By means of these lighting devices which are known as such, fouled areas and, in certain circumstances, sources of danger located beneath the vehicle can be recognized more easily—in addition, particularly in a dark environment, the subjective well being of the users of the vehicle is enhanced by the illumination of the environment of the vehicle. During the process of parking in an unilluminated environment the exterior lighting can be utilized as a parking aid.

With the known lighting devices, in the vast majority of cases incandescent lamps and, relatively rarely, also gas discharge lamps are employed as electrical lighting means. These two types of lighting means have major disadvantages for the stated purpose of illuminating definite regions inside or outside a vehicle.

The principal disadvantage with the use of incandescent lamps is their very high incandescent-coil temperatures which are made necessary by the system for operation and the high thermal loads that occur as a result, concentrated in one place. In addition, the incandescent lamps themselves are relatively large and offer acceptable light efficiency in operation only when they are installed together with an appropriate reflector. The high thermal losses, the size of the incandescent lamps and the use of reflectors give rise to a minimum size of such lighting devices, which cannot be reduced. This minimum size renders difficult the integration of this lighting device into subassemblies that are present on the vehicle, such as, for instance, the outside mirror, the inside rear-view mirror, vehicle sheets (panels), bumpers, trim strips, covers, consoles, shelves, glove compartments and ashtrays.

For this reason, in many cases the lighting devices have to be arranged in places that are unfavorable for the emission of light, since only in such places is the requisite space available for mounting of the lighting device. Since the size proportions are different in every vehicle, no universally applicable lighting devices can be employed that are economical to manufacture on an industrial scale, but rather a vehicle-specific lighting device has to be developed and manufactured for each type of vehicle. overall, the creative scope as regards the design of lighting devices of this type is severely limited.

By virtue of the thermal losses of incandescent lamps which occur concentrated in one place, temperature problems arise in the region of the mounting location of the lighting device. As a result of the waste heat that arises, the materials of the surrounding subassemblies are very severely loaded thermally. In order to counteract damage to these materials, use is made of expensive, temperature resistant materials, and elaborate measures have to be provided for the dissipation of heat. Since even these measures would not be sufficient in the case of continuous loading, the maximum amount of waste heat has to be limited, to which end timing devices and/or thermal protection devices have to be provided, in order to switch off the lighting prior to the overheating of components. Besides, after the maximum thermal load has been attained, a long recovery interval is required with a view to cooling the components.

On account of the high temperature in the lighting coil of incandescent lamps the latter are susceptible to shock and vibration, and the service life of incandescent lamps lies distinctly below the service life of the vehicle. The lighting devices, particularly where use is made of elaborate optical systems, therefore have to be designed in such a way that the incandescent lamp can be exchanged. Since the lighting device has to be opened each time the incandescent lamp is exchanged, in the case of lighting devices arranged in the exterior region of the motor vehicle special means have to be provided for sealing. In addition, a lighting device that is capable of being disassembled gives rise to ledges or gaps in the surface of the subassemblies into which the lighting device is integrated, which can lead to wind noises or to vibration problems.

The spatial extent of the incandescent coil of incandescent lamps, together with the large exit aperture of the reflector to be used, results in a large divergence angle when light is emitted from the lighting device. A large divergence angle makes it difficult to exert influence on the beam path and hence to exercise deliberate control of the lighting characteristic, particularly also with regard to undesirable scattered light. For this reason the irradiated fields of illumination can only be adapted with difficulty to the optimal requirements of the lighting task by influencing the lighting characteristic. Optimization of the luminous-intensity distribution is also generally impossible for this reason, since, as a rule, only one incandescent lamp is used by way of light source. If extreme demands are nevertheless made as regards the shape of the luminous-intensity distribution, elaborate and expensive optical systems have to be employed, for instance special reflectors or asymmetric, nested Fresnel lens systems. The development and manufacture of such systems is time-consuming and expensive. Through the use of gas-discharge lamps only the problems caused by the thermal losses of incandescent lamps are neutralized. On the other hand, gas-discharge lamps require a still larger space for installation, and their lighting characteristic can barely be influenced, even through the use of special optical systems.

SUMMARY AND OBJECTS OF THE INVENTION

It is therefore the object of the present invention to create a lighting device that is fully capable of performing the function of the known lighting devices and that, at the same time, has a small minimum size, generates little waste heat, has a long service life which exceeds the service life of the vehicle, and has a lighting characteristic that can be well controlled. This object is achieved by means of a lighting device with a housing attachable to the vehicle and a light emitting diode positioned in the housing and emitting substantially white light.

The use of light emitting diodes for performing lighting functions is known in principle. Light-emitting diodes are relatively small that is, they generally have a diameter in the range from O,.S to 10 mm—and therefore require a relatively small minimum size, have a high efficiency, generate only little waste heat and have a long service life which exceeds the service life of the vehicle. The lighting characteristic of light-emitting diodes can be well controlled by appropriate beam-deflecting devices and/or appropriate lens systems.

One disadvantage of the light-emitting diodes known hitherto was that only monochromatic light—that is, light of a single color—of relatively low luminous intensity could be generated with them. This weak, colored light could not be used for performing most of the lighting tasks in the vehicle. As a result of the further development of light-emitting diodes it has been possible since only recently to manufacture light-emitting diodes that emit white light of relatively high luminous intensity and that are therefore able to replace the incandescent lamp or fluorescent tube by way of lighting means in lighting devices of motor vehicles. These novel light-emitting diodes are ready to come onto the market and have been cleared for use in motor vehicles.

As a matter of principle, light-emitting diodes having arbitrary available luminous intensity can be employed, whereby the luminous intensity of the light-emitting diodes and the number of light-emitting diodes to be employed have to be matched to the particular lighting task, in particular to the distance of the object to be illuminated. In this connection the light-emitting diodes should, as a rule, exhibit an emission angle that is as small as possible, in order to generate little scattered light. Light-emitting diodes are available that comprise an integrated lens and have an emission angle in the range from 10 to 30°.

The color of the white light that is capable of being generated by the light-emitting diodes is conditioned by the structural design and cannot be altered. In case this light color is not optimally suited for performing a definite lighting task, the lighting device should comprise at least one light-emitting diode that emits monochromatic light that is, colored light. The monochromatic and white light of the various light-emitting diodes mix on the field of illumination, as a result of which the light color can be optimally adapted to requirements by means of an appropriate mixing ratio.

In many cases the luminous intensity of one light-emitting diode alone is not sufficient for illuminating a sufficiently large field of illumination with adequate luminous intensity. In these cases several light-emitting diodes have to be combined in the lighting device, in order to add the luminous intensities of the individual light emitting diodes on the field of illumination.

Owing to the structural design, the individual light emitting diodes in the lighting device have to be arranged side by side. Since the light-emitting diodes generate a cone of light which spreads out in substantially linear manner along its beam axis, several circles of illumination located alongside one another arise on the field of illumination as a result of the several light-emitting diodes. Accordingly, through the simple addition of further light emitting diodes, the size of the field of illumination can be enlarged, but an increase in the luminous intensity at a definite point of the field of illumination is not possible in this way.

If the light emitted from the lighting device is to be concentrated at one or more definite points in order to change the lighting characteristic, at least two light emitting diodes with beam axes extending in non-parallel manner in relation to one another may be arranged to this end in the lighting device. The relative arrangement of the light-emitting diodes should be chosen in such a way that the circles of light overlap on the field of illumination so as to correspond to the desired lighting characteristic.

Although by virtue of the arrangement of the light-emitting diodes in the lighting device the lighting characteristic can be varied by means of differing emission angles, to this end an elaborate carrier body for the light-emitting diodes is necessary which provides for the appropriately aligned relative arrangement. In particular, the arrangement of light-emitting diodes on a printed circuit board is then not possible, since the light-emitting diodes on a card module of this type all exhibit the same beam axis path perpendicular to the printed board. If the lighting characteristic is to be influenced in these cases, then a lens system arranged in front of the light-emitting diodes can be arranged in the beam path of the light emitted from the individual light-emitting diodes, The lens system deflects the light beams in a manner corresponding to the desired lighting characteristic. The arrangement and configuration of the individual lenses in the lens system should be matched to the desired lighting characteristic.

If a field of illumination of particularly differentiated form is necessary, both concepts can be combined with one another with a view to influencing the lighting characteristic. That is, on the one hand the lighting device scatters the light through a lens system and the individual light-emitting diodes have a specially aligned beam axis.

It is particularly economical in manufacture to combine the individual light-emitting diodes of a lighting device in a manner known as such on a printed circuit board or conductor foil (pcb's) so as to form an LED module. With the use of a printed circuit board a two-dimensional distribution of the light-emitting diodes is possible, with the use of conductor foil a three-dimensional distribution of the light-emitting diodes in the lighting device is possible. Via the printed circuit board or conductor foil the light-emitting diodes can be provided with current centrally and the LED module can be simply mounted in the form of a prefabricated subassembly in a housing. As a matter of principle, the electronics for driving the light-emitting diodes may be arranged at any place in the vehicle, even at a place remote from the light-emitting diodes, for instance by integration into an on-board computer. In an embodiment worthy of preference, the electrical circuits for driving the light-emitting diodes that is, the necessary electrical components and electrical conducting paths, can be combined together with the light emitting diodes on a printed circuit board or conductor foil so as to form an LED module. This integration reduces the effort expended on cabling and mounting. The card modules can be manufactured economically on an industrial scale in a manner known as such.

If the lighting device is employed in the exterior region of the motor vehicle, measures have to be taken in order to rule out contact of the LED module with water. Penetrating moisture can give rise to fault currents and short-circuits and hence lead to malfunctions of the electrical components and damage thereto. The LED module should therefore preferably be constructed so as to be protected against water, in order to prevent contact of penetrating moisture with the electrical components. As a result of the water protected construction of the appropriate regions of the LED module an elaborate water-tight seal of the entire housing can be dispensed with. The moisture protection can be achieved in particularly simple and economical if the LED module is cast at least zonally into a water resistant material, for instance a resin. When designing the resin mantle, care should be taken to ensure that sufficient dissipation of heat from the LED module is possible. The light-emitting diodes themselves should not be cast in resin, since excessive light losses would be caused as a result. The unprotected regions of the LED module, for instance the side of a printed circuit board on which the light-emitting diodes are arranged, should be protected against moisture by appropriately different sealing measures.

Since the service life of the light-emitting diodes exceeds the service life of the motor vehicle, under normal circumstances the exchange of light emitting diodes during the service life of the motor vehicle is not necessary. Therefore it is particularly favorable to connect the light-emitting diode or the LED module to the housing permanently, for the permanent connection between light emitting diode or LED module and the housing can be manufactured in particularly economical manner, for instance by bonding the components with adhesive, and is particularly vibration-proof and shockproof. If a light emitting diode fails during the service life of the vehicle, then in the case of single-part housings the entire housing has to be exchanged, in the case of multi-part housings the housing part that is permanently connected to the light-emitting diode or the LED module has to be exchanged. Although this makes the exchange of the light-emitting diodes more expensive, on account of the intrinsically high life expectancy of the light-emitting diodes it occurs very rarely.

In principle it is sufficient if the light-emitting diodes are arranged on the outside of the housing of the lighting device and the generated light can be emitted towards the desired field of illumination. However, in this case the light-emitting diodes are exposed to all external influences, in particular to mechanical damage and atmospheric influences. In order to protect the light-emitting diodes against these influences it is advantageous if a transparent cover plate is arranged in the housing in the beam path of the light-emitting diodes. In other words, the light-emitting diodes are accommodated in encapsulated manner between cover plate and housing. The light generated can pass unhindered through the transparent material of the plate, and unfavorable mechanical and atmospheric influences are kept away from the light emitting diodes. The plate should therefore have sufficient mechanical strength and be connected to the housing so as to be as watertight as possible. If the lighting characteristic of the lighting device is to be influenced by the arrangement of a lens system in front of the light-emitting diodes, this can be accomplished in particularly economical manner if the necessary lenses are incorporated into the transparent cover plate in front of the light-emitting diodes. This can be effected by means of an appropriate ground surface of the cover plate or by the arrangement of lens-type regions of thicker material in the cover plate. It is particularly favorable to form the regions located in each instance opposite a light-omitting diode as lenses on the side of the cover plate facing the light-emitting diodes. Hence the beam path of the individual light-emitting diodes can be selectively controlled, since for each light-emitting diode a lens is provided with which the light beam can be deflected, and the smooth outside of the cover plate can be connected in substantially gap-free manner to the outside of the housing, so that no dirt can get caught in the transition region and no undesirable wind noises arise. In addition, the lenses on the inside of the cover plate are protected against damaging mechanical influences.

The cover plate may be manufactured from any transparent material and, accordingly, in particular also from glass. However, glass has the disadvantage that it in relatively brittle and therefore breaks easily and the provision of lenses in the glass, for instance by means of an appropriate ground surface, is relatively elaborate. In an embodiment worthy of preference, the cover plate should therefore be manufactured from a transparent plastic. Plastic is light, has a sufficiently high mechanical strength and furthermore is weather-resistant. A cost advantage results from this, namely that the requisite lens system can be manufactured very simply by appropriate modification of the shape of the plastic cover plate. To this end lens-shaped elevations merely have to be provided on one or both sides of the cover plate. To achieve this, the negative shape of these lens-shaped elevations merely has to be incorporated into an injection mould. As a result, the tool costs increase by a small amount, but the actual manufacturing costs of a cover plate with lenses made of plastic are no higher than those of a cover plate with no lens.

In connection with the shaping of the lenses it is advantageous to provide smooth lenses—that is, lenses having a smooth lens surface. Although lenses with surface structure, for example Fresnel lenses, are also conceivable, the surface structure reduces the light efficiency of the lighting device.

The cover plate is inserted into the housing in the region above the light-emitting diodes and is secured. In this regard a secure seating of the cover plate has to be guaranteed, in order that the latter does not get lost after a relatively long period. In addition to this, the light-emitting diodes must be protected as far as possible against moisture and dirt, on account of which the gap between cover plate and housing should be sealed as tightly as possible. This can be achieved, for instance, by the cover plate being secured into the housing with adhesive.

It is more economical if the cover plate and the housing are manufactured jointly in a multi-part injection-molding process. In this case the housing made of simple plastic and the cover plate made of transparent plastic are manufactured simultaneously in a common injection mold. In the process, the transparent plastic of the cover plate connects to the plastic of the housing in an interface, so that the cover plate becomes an integral constituent of the housing. With this design the light-emitting diodes are securely protected against moisture and dirt, since there is material closure between cover plate and housing. In case, for instance, the two plastics for cover plate and housing are not compatible with one another and therefore cannot be processed jointly in an injection mould, it in also possible of course to manufacture the two components separately and to connect them to one another by means of a clip connection or such like.

Since the properties of light-emitting diodes, in particular the current-carrying capacity and the luminous intensity emitted, are temperature-dependent, the current supply of the light-emitting diodes should be effected in a manner known as such via a non-linear resistance network or a device for pulse-width modulation. In particular, by means of a pulse-width modulation of the current it is possible for the necessary temperature compensation of the current characteristic to be implemented simply and, in addition, for smooth switching of the light-emitting diodes on and off to be achieved with a view to enhancing comfort.

Since fluctuations in the operating voltage in the on-board supply system of a motor vehicle may occur which can damage the light-emitting diodes, measures should be taken to protect the light-emitting diodes against overvoltages. For example, at least one protective diode should be connected in series to the light-emitting diodes in order to protect them against polarity reversal. Of course, other protective measures are also conceivable, but protective diodes enable particularly low peak reverse voltages.

Since light-emitting diodes also generate a certain degree of waste heat, the temperature in the lighting device, particularly in the case of continuous operation of the lighting device, can rise to an impermissible high level. In order to be able to rule out damage to the components as a result of excessive temperature loading it is advantageous to monitor the temperature in or on the lighting device with a temperature sensor. The output signal of this temperature sensor can then be relayed to the control system of the current supply of the light emitting diode, and the current supply can be controlled as a function of the temperature in the lighting device as measured by a temperature sensor. In this connection the control system either may confine itself to switching off the current supply in the event of a reference temperature being exceeded or may ease off the current supply in proportion to the temperature.

In order to be able to utilize the light emitted by the light-emitting diodes optimally it is advantageous to provide light-guiding elements on the light-emitting diodes that concentrate the generated light in one direction. One variant of such a light-guiding element arises if the light-emitting diode is surrounded by a pipe-like tube. The light is reflected in the tube and is able to emerge only at the opening of the tube. Light-guiding elements are also conceivable that are arranged at least on one side of the light-emitting diode. By means of these one-sided light guiding elements, a shadow is generated on one side of the light-emitting diodes and the entire amount of light is emitted in the other direction.

Of course, it is possible to configure a lighting device of the proposed type as an individual subassembly—ie, with its own housing—and to secure it in or on the vehicle. However, it is visually more appealing and more economical to design the housing as part of an existing subassembly. In other words, this means that the lighting device is integrated into another subassembly, and a multi-function subassembly with a common housing is formed in this way.

In principle, many subassemblies of a motor vehicle are conceivable into which a lighting device of the proposed type could be usefully integrated. Subassemblies that may be mentioned are, in particular, bumpers, sunroof operating modules, luggage-compartment covers, engine-compartment covers, glove compartments, ashtrays, vehicle keys, storage compartments, center consoles, seats and such like. This holds true all the more, since no lighting devices were able to be integrated into many of these subassemblies on account of the lack of construction space or the inadequate dissipation of waste heat. It is particularly favorable if the housing of the lighting device is formed as part of an inside rear-view mirror, as a result of which the lighting device becomes an integral constituent of the inside rear-view mirror. By virtue of the positioning of the inside rear-view mirror in the upper region of the passenger compartment the lighting device can serve in particular as a reading lamp and/or for illuminating the interior. Since the light-emitting diodes require only a small construction-space and give off little waste heat, the inside rear-view mirror does not have to be changed substantially in its external slender shape. For this reason, reshaping can largely be dispensed with. If a lighting device according to the invention is arranged in the interior of the vehicle, said lighting device may, given appropriate matching of the lighting characteristic, also continue to burn during vehicle operation and thereby illuminate, selectively and with little glare, partial regions of the interior of the vehicle during the journey, for instance the gear-shift lever or shelf surfaces.

Also, a plurality of white light emitting diodes of this present invention can be positioned to radiate down from the lower portion of the interior rearview mirror housing to function as a map/reading light for illuminating the lap region of occupants seated in the front driver seat and/or front passenger seat. A cluster of at least two, and preferably at least four, white light emitting LEDs can be positioned at the driver side of the interior mirror housing and can be turned on at will by the driver via a switch. Likewise, a corresponding cluster of LEDs can be provided at the passenger side of the interior rearview mirror housing. Such a multi-LED cluster can form a light module. Alternatively, a light module comprising a cluster of white light emitting LEDs can be positioned to radiate from a pod attached to a rearview mirror assembly mount. It is also advantageous to form the housing of the lighting device as part of a trim strip. Trim strips of this type with integrated lighting device may then be arranged in the door region of the motor vehicle and illuminate the region of the road below the doors during the process of entry. Implementation of a lighting device in the trim strip with one or more incandescent lamps would not be possible, on account of the requisite construction space and the large amounts of waste heat. On the other hand, a narrow elongated printed board with a plurality of light-emitting diodes arranged thereon can be integrated very well into the narrow structure of a trim strip.

On account of their solid geometry the door handles of the vehicle are likewise very well suited for the integration of a linear arrangement of light-emitting diodes. To be considered in particular in this connection are the handles on the driver's side, on the front passenger's side and on the rear side. The lighting device integrated into the door handles may either be employed for illuminating the surrounding region outside the respective door and/or serve as an orientation aid making it easier for the users of the vehicle to find the door handles.

Lighting devices that are integrated into the outside rearview mirror serve the same purpose of illuminating the entry region outside the doors. A design that is worthy of preference is therefore to form the housing of the lighting device as part of an outside rear-view mirror. The small structural design of the individual light-emitting diodes makes it possible to position them optimally in the outside rear-view mirror for the purpose of performing the lighting task. This means that the light-emitting diodes may be arranged very far out, close to the outer end of the outside rear-view mirror, something which is not possible in the case of lighting devices with an incandescent lamp, since only very little construction space is available in this region of the outside rear-view mirror. In addition, the placement of the lighting device at the outer end of the outside rear-view mirror makes possible the illumination of the part of the entry region that is already situated below the floor of the vehicle.

Vehicle types of particularly high quality are equipped with outside rear-view mirror that are capable of being folded away. If, for example, the vehicle is being parked, the outside rear-view mirror can be swivelled towards the vehicle body by means of an electrical fold-away drive, in order to prevent damage. As a result, the outside rear-view mirror can occupy two different positions. If the housing of the lighting device according to the invention is formed as part of the outside rear-view mirror, a different path of the light beam arises as a result of the outside rearview mirror being folded away. The consequence of this can be that the lighting device in the first position of the outside rear-view mirror illuminates the region of the road outside the doors, as desired, and in the second position it irradiates only the vehicle body.

In the case where the lighting device according to the invention is incorporated into an outside rear-view mirror that is capable of being folded away, the lighting device should for this reason preferably comprise at least two groups of light-emitting diodes, the current supply of the individual groups of light-emitting diodes being capable of being switched as a function of the position of the outside rear-view mirror. In the extreme case, each of the groups of light-emitting diodes may also consist of only one individual light-emitting diode.

Since the proposed lighting device is not desired by all prospective buyers of a vehicle type at a correspondingly higher price, it is conceivable for only some of the vehicles of one type that have been delivered to be provided with such lighting devices as special equipment. If the lighting device is not fitted in all vehicles of one type but only as special equipment, depending on the wishes of the customer, the lighting device should take the form of a removable part of a vehicle assembly, in particular as a cover ring or covering cap of an outside rear-view mirror. By this means all vehicles of the same type could be equipped with, in principle, the same vehicle subassembly, for instance an outside rear-view mirror, and the modification with respect to the special equipment would be possible by order-related exchange of the removable part of this vehicle subassembly, for instance the cover ring or the covering cap of an outside rear-view mirror. By virtue of this measure, the multiplicity of parts in connection with the mounting of the motor vehicle could be diminished and the associated costs could be lowered.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
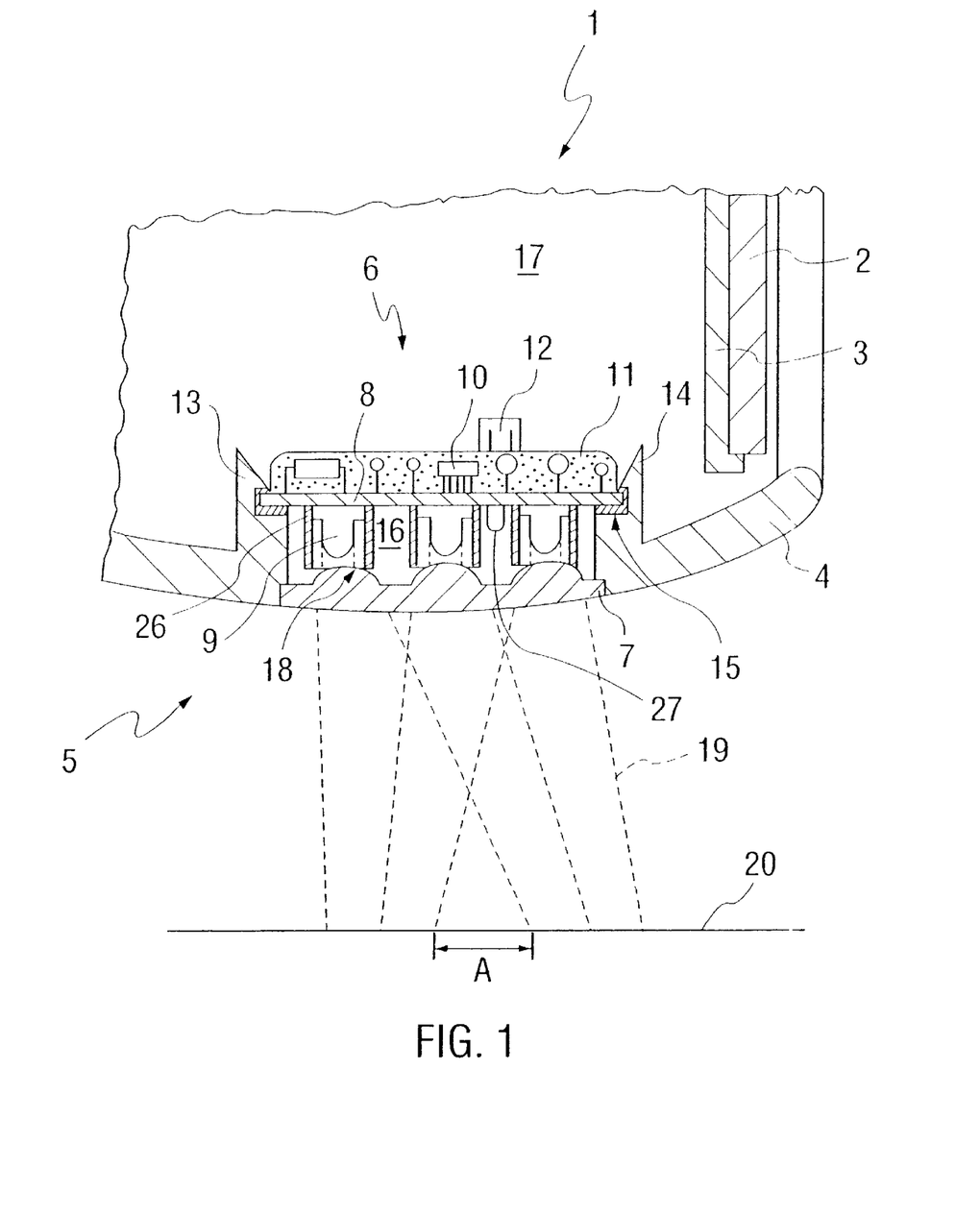
FIG. 1 is a view of the lower part of an outside rear-view mirror with an integrated LED lighting device in cross-section.

Referring to the drawings, FIG. 1 shows an outside rear-view mirror 1 of a motor vehicle with a mirror element 2, a carrier plate 3 and a housing 4. For better visibility, merely the lower part of the housing 4, facing the rear end of the vehicle, is represented. The electrical drive and the adjusting mechanisms for adjusting the carrier plate 3 in the housing 4 are not represented.

Integrated into the lower component wall of the housing 4 is a lighting device 5. The housing 4 of the outside rearview mirror 1 consequently forms, at the same time, the housing for the lighting device 5. The lighting device 5 comprises an LED module 6, with the printed circuit board 8, and a cover plate 7.

In the LED module 6 there are integrated on one side of the printed circuit board 8 light-emitting diodes 9 which emit white light with an emission angle of +/−15°, and, on the other side of the printed circuit board 8, electrical components 10 for driving the light-emitting diodes 9. The electrical components 10 on the rear side of the printed circuit board 8 are surrounded by a corrosion resistant material 11 such as a resin mantle and are protected in this way against moisture. The electrical connection of the LED module 6 is effected via a plug 12. The light-emitting diodes 9 are each surrounded by an open, pipe-like tube 26 which reduces the scattered light emitted and provides for a beam path directed substantially vertically downwards.

Integrated into the component wall of the housing 4 are the two members 13 and 14 projecting inwards into the housing, to which the LED module 6 can be secured. To this end the members 13 and 14 exhibit zonally a clip contour that is complementary in shape to the outer contour of the printed circuit board 8. When the LED module 6 is mounted into the housing 4 a sticky sealing compound 15 is applied in the region of the contact surfaces, which permanently connects the LED module 6 to the housing 4 and terminates the region 16 on the lower side of the LED module 6 in air-tight manner in relation to the region 17 in the housing 4 above the LED module 6.

The cover plate 7 consists of transparent plastic. Cover plate 7 and housing 4 are manufactured in a two-component injection-molding process, on account of which a fluid material transition between the housing 4 and the cover plate 7 arises. The sharp component boundaries drawn in FIG. 1 between housing 4 and cover plate 7 serve merely for better visibility and do not reproduce the actual boundaries, which are indistinct. By virtue of this manufacture of cover plate 7 and housing 4 by material closure an air-tight connection arises between these two components. As a result, by means of the connection by material closure between housing 4 and cover plate 7 and the air-tight securing with adhesive of the LED module 6 into the members 13 and 14 which pass around it in closed manner, a chamber that is encapsulated in air-tight manner is formed in the region 16 between the printed circuit board 8 and the cover plate 7. The light-emitting diodes 9 are securely protected against moisture and dirt in this air-tight chamber in the region 16.

On the inside of the cover plate 7 the lenses 18 are integrated into the cover plate 7, in each instance opposite the light-emitting diodes 9. For the purpose of manufacturing these lenses, lens-shaped depressions were sunk in the injection mould, so that lens-shaped material elevations are formed on the transparent cover plate 7 which act as converging lenses. If required, diverging lenses may also be implemented by forming appropriate material depressions in the cover plate 7. The lenses are arranged on the upper side of the cover plate 7 and are therefore likewise located in the protectively encapsulated region 16.

The lenses 18 serve to influence the beam path 19 of the light emitted from the individual light-emitting diodes 9. The light-emitting diodes 9 on the printed circuit board 8 all have the same emission angle, on account of which a lens system has to be arranged in front of the light emitting diodes 9 with a view to controlling the lighting characteristic of the lighting device 5. By means of the lenses 18 it is possible to deflect the light beams emitted from the individual light-emitting diodes 9 with, in each instance, parallel beam axes and thereby to concentrate them in the region A of the field of illumination 20. Hence the lighting characteristic of the lighting device 5 can be influenced selectively.

The temperature sensor 27 is arranged between two of the light-emitting diodes 9. The temperature sensor 27 monitors the temperature in the region between the printed circuit board 8 and the cover plate 7. If the temperature in this region rises above a reference temperature, the temperature sensor 27 issues an appropriate signal and the electrical control system of the LED module 6 interrupts the supply of current to the light-emitting diodes. Only when the temperature has decreased sufficiently is the supply of current opened again. By means of the temperature sensor 27 and the corresponding control system an impermissible thermal loading of the components is ruled out.

Figure 2:
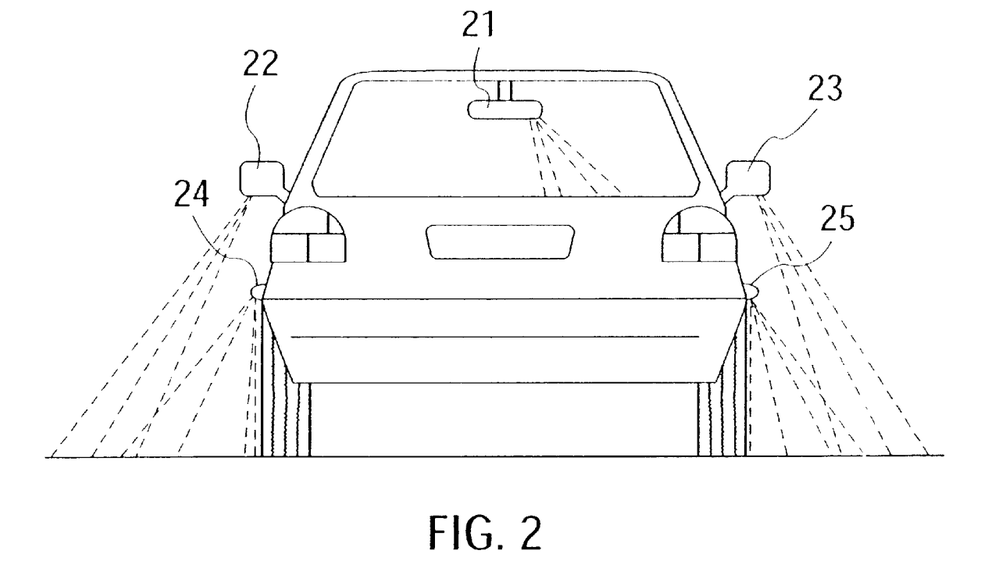
FIG. 2 is a view of a motor vehicle from behind for the purpose of representing various application possibilities of LED lighting devices.

FIG. 2 shows a motor vehicle in a view from behind. Lighting devices according to the invention are integrated in each instance in an inside rear-view mirror 21, in the two outside rear-view mirrors 22 and 23 and in the trim strips 24 and 25, which are arranged in the door region of the motor vehicle. The lighting device in the inside rearview mirror 21 can be utilized as interior lighting or as a reading lamp. The lighting devices in the outside rearview mirrors 22 and 23 and also in the trim strips 24 and 25 serve to illuminate the entry region of the motor vehicle, in order to enhance the safety and the comfort of the users of the vehicle.

Figure 3:
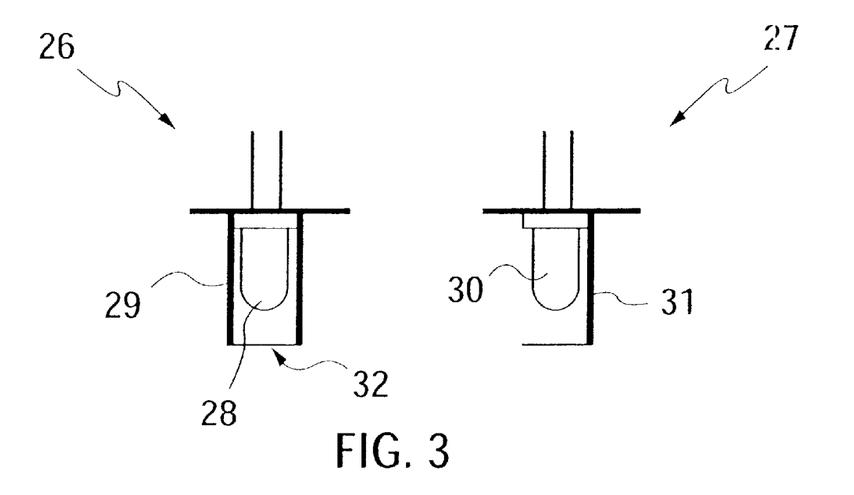
FIG. 3 is a view of two embodiments of light-emitting diodes with a light-guiding element.

FIG. 3 shows two embodiments 26 and 27 of light-emitting diodes with a light-guiding element. In the case of the embodiment 26 the light-emitting diode 28 is surrounded by a pipe-like tube 29, so that the light generated is able to emerge only at the end 32 of the tube and is concentrated in a cone of light.

In the case of the embodiment 27 a light-guiding element 31 is arranged on the right-hand side of the light-emitting diode 27, so that only the region on the left-hand side of the light-emitting diode 30 is illuminated and a shaded region arises on the right-hand side.

While specific embodiments of the invention have been shown and described in detail to illustrate the application of the principles of the invention, it will be understood that the invention may be embodied otherwise without departing from such principles.

What is claimed is:

1. A vehicular lighting system suitable for use in a motor vehicle, the system comprising:
   a subassembly of the vehicle, said subassembly comprising one of an interior rearview mirror assembly, an outside mirror assembly, a door handle assembly, a bumper, a trim element, a luggage-compartment cover, a sunroof-operating module, an engine-compartment cover, a glove compartment, an ashtray, a storage compartment, and a seat;
   a lighting module included in said subassembly of the vehicle, said lighting module comprising at least one white light emitting diode;
   said lighting module further comprising electrical circuitry for supplying electrical power to said at least one white light emitting diode;
   wherein said at least one white light emitting diode individually emits substantially white light when said at least one white light emitting diode is powered by said electrical circuitry; and
   wherein said electrical circuitry and said at least one white light emitting diode are commonly mounted on a circuit element.

2. The lighting system in accordance with claim 1, wherein said at least one white light emitting diode comprises at least two white light emitting diodes.

3. The lighting system in accordance with claim 1, wherein said lighting module comprises said at least one white light emitting diode and a second light emitting diode and wherein said at least one white light emitting diode has a first light beam axis and said second light emitting diode has a second light beam axis, said second light beam axis being nonparallel to said first light beam axis.

4. The lighting system in accordance with claim 1, said lighting module further comprising a lens arranged in a beam path of light emitted by said at least one white light emitting diode.

5. The lighting system in accordance with claim 1, wherein said circuit element comprises a circuit board.

6. The lighting system in accordance with claim 1, wherein said circuit element comprises a conductor foil.

7. The lighting system in accordance with claim 1, wherein said lighting module is protected against penetration of moisture.

8. The lighting system in accordance with claim 1, wherein said subassembly comprises an outside mirror assembly and wherein said lighting module illuminates the entry region adjacent a door of the vehicle when said at least one white light emitting diode is powered by said electrical circuitry.

9. The lighting system in accordance with claim 1, wherein a transparent cover is provided in a beam path of light emitted by said least one first white light emitting diode.

10. The lighting system in accordance with claim 9, wherein said transparent cover has a diode side facing said at least one white light emitting diode, said transparent cover diode side comprising a lens.

11. The lighting system in accordance with claim 9, wherein said transparent cover comprises a plastic material.

12. The lighting system in accordance with claim 1, wherein said lighting module comprises a module housing and a transparent cover and wherein said lighting module housing and said cover are manufactured jointly in a multicomponent injection molding process.

13. The lighting system in accordance with claim 12, further comprising a clip connection connecting said transparent cover to said lighting module housing.

14. The lighting system in accordance with claim 1, wherein said electrical circuitry comprises a non-linear resistance network connected with said at least one white light emitting diode.

15. The lighting system in accordance with claim 1, wherein said electrical circuitry comprises a pulse width modulation circuit connected with said at least one white light emitting diode.

16. The lighting system in accordance with claim 1, wherein said electrical circuitry comprises a diode connected with said at least one white light emitting diode.

17. The lighting system in accordance with claim 1, further comprising a temperature sensor, said electrical circuitry controlling the current supply to said at least one white light emitting diode as a function of temperature measured by said temperature sensor.

18. The lighting system in accordance with claim 1, further comprising a light-guiding element for said at least one white light emitting diode.

19. The lighting system in accordance with claim 18 wherein said light-guiding element comprises a tube.

20. The lighting system in accordance with claim 1, wherein said subassembly comprises an interior rearview mirror assembly.

21. The lighting system in accordance with claim 1, wherein said subassembly comprises an outside mirror assembly.

22. The lighting system in accordance with claim 1, wherein said subassembly comprises a trim element.

23. The lighting system in accordance with claim 1, wherein said subassembly comprises an interior rearview mirror assembly and wherein said lighting module comprises at least one of a reading lamp, a console-illuminating lamp and a gear-shift lever illuminating lamp.

24. The lighting system in accordance with claim 1, wherein said subassembly comprises an interior rearview mirror and wherein said lighting module comprises a reading lamp.

25. The lighting system in accordance with claim 1, wherein said subassembly comprises a trim element and wherein said lighting module comprises an interior cabin illuminating lamp.

26. The lighting system in accordance with claim 1, further comprising another lighting module adapted for attachment to the vehicle including another at least one white light emitting diode, said another at least one white light emitting diode individually emitting substantially white light when electrically powered.

27. The lighting system in accordance with claim 26, wherein said another lighting module is adapted for attachment to an outside mirror assembly of the vehicle.

28. The lighting system in accordance with claim 1, wherein said lighting module is removable from said subassembly of the vehicle.

29. The lighting system in accordance with claim 22, wherein said lighting module is removable from said trim element of the vehicle.

30. The lighting system in accordance with claim 1, wherein said subassembly comprises an interior rearview mirror assembly, wherein said interior rearview mirror assembly comprises a mirror housing having a driver side portion and a passenger side portion, said interior rearview mirror assembly further comprising a mirror mount for attachment of said interior rearview mirror assembly to an interior portion of the vehicle and wherein said lighting module radiates light generally downwardly from said interior rearview mirror assembly.

31. The lighting system in accordance with claim 30, wherein said lighting module comprises a driver side lighting assembly included at said driver side portion of said mirror housing.

32. The lighting system in accordance with claim 30, wherein said lighting module comprises a passenger side lighting assembly included at said passenger side portion of said mirror housing.

33. The lighting system in accordance with claim 30, wherein said mirror mount includes said lighting module.

34. A system of claim 30, wherein said lighting module is positioned in a pod attached to said mirror mount.

35. A vehicular lighting system suitable for use in a motor vehicle, the system comprising:
a subassembly of the vehicle, said subassembly comprising one of an interior rearview mirror assembly, an outside mirror assembly, a door handle assembly, a bumper, a trim element, a luggage-compartment cover, a sunroof-operating module, an engine-compartment cover, a glove compartment, an ashtray, a storage compartment, and a seat;
a lighting module included in said subassembly of the vehicle, said lighting module comprising at least one white light emitting diode;
said subassembly further comprising electrical circuitry for supplying electrical power to said at least one white light emitting diode;
wherein said at least one white light emitting diode individually emits substantially white light when said at least one white light emitting diode is powered by said electrical circuitry; and
wherein said lighting module is protected against penetration of moisture.

36. The lighting system in accordance with claim 35, wherein said at least one white light emitting diode comprises at least two white light emitting diodes.

37. The lighting system in accordance with claim 35, wherein said lighting module comprises said at least one white light emitting diode and a second light emitting diode and wherein said at least one white light emitting diode has a first light beam axis and said second light emitting diode has a second light beam axis, said second light beam axis being nonparallel to said first light beam axis.

38. The lighting system in accordance with claim 35, said lighting module further comprising a lens arranged in a beam path of light emitted by said at least one white light emitting diode.

39. The lighting system in accordance with claim 35, wherein said lighting module includes said electrical circuitry and wherein said electrical circuitry and said at least one white light emitting diode are commonly mounted on a circuit element.

40. The lighting system in accordance with claim 39, wherein said circuit element comprises a conductor foil.

41. The lighting system in accordance with claim 39, wherein said circuit element comprises a circuit board.

42. The lighting system in accordance with claim 35, wherein said subassembly comprises an outside mirror assembly and wherein said lighting module illuminates the entry region adjacent a door of the vehicle when said at least one white light emitting diode is powered by said electrical circuitry.

43. The lighting system in accordance with claim 35, wherein a transparent cover is provided in a beam path of light emitted by said least one first white light emitting diode.

44. The lighting system in accordance with claim 43, wherein said transparent cover has a diode side facing said at least one white light emitting diode, said transparent cover diode side comprising a lens.

45. The lighting system in accordance with claim 43, wherein said transparent cover comprises a plastic material.

46. The lighting system in accordance with claim 35, wherein said lighting module comprises a module housing and a transparent cover and wherein said lighting module housing and said cover are manufactured jointly in a multicomponent injection molding process.

47. The lighting system in accordance with claim 46, further comprising a clip connection connecting said transparent cover to said lighting module housing.

48. The lighting system in accordance with claim 35, wherein said electrical circuitry comprises a non-linear resistance network connected with said at least one white light emitting diode.

49. The lighting system in accordance with claim 35, wherein said electrical circuitry comprises a pulse width modulation circuit connected with said at least one white light emitting diode.

50. The lighting system in accordance with claim 35, wherein said electrical circuitry comprises a diode connected with said at least one white light emitting diode.

51. The lighting system in accordance with claim 35, further comprising: a temperature sensor, said electrical circuitry controlling the current supply to said at least one white light emitting diode as a function of temperature measured by said temperature sensor.

52. The lighting system in accordance with claim 35, further comprising a light-guiding element for said at least one white light emitting diode.

53. The lighting system in accordance with claim 52 wherein said light-guiding element comprises a tube.

54. The lighting system in accordance with claim 35, wherein said subassembly comprises an interior rearview mirror assembly.

55. The lighting system in accordance with claim 35, wherein said subassembly comprises an outside mirror assembly.

56. The lighting system in accordance with claim 35, wherein said subassembly comprises a trim element.

57. The lighting system in accordance with claim 35, wherein said subassembly comprises an interior rearview mirror assembly and wherein said lighting module comprises at least one of a reading lamp, a console-illuminating lamp and a gear-shift lever illuminating lamp.

58. The lighting system in accordance with claim 35, wherein said subassembly comprises an interior rearview mirror and wherein said lighting module comprises a reading lamp.

59. The lighting system in accordance with claim 35, wherein said subassembly comprises a trim element and wherein said lighting module comprises an interior cabin illuminating lamp.

60. The lighting system in accordance with claim 35, further comprising another lighting module adapted for attachment to the vehicle including another at least one white light emitting diode, said another at least one white light emitting diode individually emitting substantially white light when electrically powered.

61. The lighting system in accordance with claim 60, wherein said another lighting module is adapted for attachment to an outside mirror assembly of the vehicle.

62. The lighting system in accordance with claim 35, wherein said lighting module is removable from said subassembly of the vehicle.

63. The lighting system in accordance with claim 56, wherein said lighting module is removable from said trim element of the vehicle.

64. The lighting system in accordance with claim 35, wherein said subassembly comprises an interior rearview mirror assembly, wherein said interior rearview mirror assembly comprises a mirror housing having a driver side portion and a passenger side portion, said interior rearview mirror assembly further comprising a mirror mount for attachment of said interior rearview mirror assembly to an interior portion of the vehicle and wherein said lighting module radiates light generally downwardly from said interior rearview mirror assembly.

65. The lighting system in accordance with claim 64, wherein said lighting module comprises a driver side lighting assembly included at said driver side portion of said mirror housing.

66. The lighting system in accordance with claim 64, wherein said lighting module comprises a passenger side lighting assembly included at said passenger side portion of said mirror housing.

67. The lighting system in accordance with claim 64, wherein said mirror mount includes said lighting module.

68. A system of claim 64, wherein said lighting module is positioned in a pod attached to said mirror mount.

69. A vehicular lighting system suitable for use in a motor vehicle, the system comprising:

a subassembly of the vehicle, said subassembly comprising one of an interior rearview mirror assembly and an outside mirror assembly;

a lighting module included in said subassembly of the vehicle, said lighting module comprising at least one white light emitting diode;

said subassembly further comprising electrical circuitry for supplying electrical power to said at least one white light emitting diode;

wherein said at least one white light emitting diode individually emits substantially white light when said at least one white light emitting diode is powered by said electrical circuitry;

wherein said lighting module is protected against penetration of moisture; and wherein said lighting module is removable from said subassembly of the vehicle.

70. The lighting system in accordance with claim 69, wherein said at least one white light emitting diode comprises at least two white light emitting diodes.

71. The lighting system in accordance with claim 69, wherein said lighting module comprises said at least one white light emitting diode and a second light emitting diode and wherein said at least one white light emitting diode has a first light beam axis and said second light emitting diode has a second light beam axis, said second light beam axis being nonparallel to said first light beam axis.

72. The lighting system in accordance with claim 69, said lighting module further comprising a lens arranged in a beam path of light emitted by said at least one white light emitting diode.

73. The lighting system in accordance with claim 69, wherein said lighting module includes said electrical circuitry and wherein said electrical circuitry and said at least one white light emitting diode are commonly mounted on a circuit element.

74. The lighting system in accordance with claim 73, wherein said circuit element comprises a conductor foil.

75. The lighting system in accordance with claim 73, wherein said circuit element comprises a circuit board.

76. The lighting system in accordance with claim 69, wherein said subassembly comprises an outside mirror assembly and wherein said lighting module illuminates the entry region adjacent a door of the vehicle when said at least one white light emitting diode is powered by said electrical circuitry.

77. The lighting system in accordance with claim 69, wherein a transparent cover is provided in a beam path of light emitted by said least one first white light emitting diode.

78. The lighting system in accordance with claim 77, wherein said transparent cover has a diode side facing said at least one white light emitting diode, said transparent cover diode side comprising a lens.

79. The lighting system in accordance with claim 77, wherein said transparent cover comprises a plastic material.

80. The lighting system in accordance with claim 69, wherein said lighting module comprises a module housing and a transparent cover and wherein said lighting module housing and said cover are manufactured jointly in a multicomponent injection molding process.

81. The lighting system in accordance with claim 80, further comprising a clip connection connecting said transparent cover to said lighting module housing.

82. The lighting system in accordance with claim 69, wherein said electrical circuitry comprises a non-linear resistance network connected with said at least one white light emitting diode.

83. The lighting system in accordance with claim 69, wherein said electrical circuitry comprises a pulse width modulation circuit connected with said at least one white light emitting diode.

84. The lighting system in accordance with claim 69, wherein said electrical circuitry comprises a diode connected with said at least one white light emitting diode.

85. The lighting system in accordance with claim 69, further comprising a temperature sensor, said electrical circuitry controlling the current supply to said at least one white light emitting diode as a function of temperature measured by said temperature sensor.

86. The lighting system in accordance with claim 69, further comprising a light-guiding element for said at least one white light emitting diode.

87. The lighting system in accordance with claim 86 wherein said light-guiding element comprises a tube.

88. The lighting system in accordance with claim 69, wherein said subassembly comprises an interior rearview mirror assembly.

89. The lighting system in accordance with claim 69, wherein said subassembly comprises an outside mirror assembly.

90. The lighting system in accordance with claim 69, wherein said outside mirror assembly comprises a fold-away outside mirror assembly.

91. The lighting system in accordance with claim 69, wherein said subassembly comprises an interior rearview mirror assembly and wherein said lighting module comprises at least one of a reading lamp, a console-illuminating lamp and a gear-shift lever illuminating lamp.

92. The lighting system in accordance with claim 69, wherein said subassembly comprises an interior rearview mirror assembly and wherein said lighting module comprises a reading lamp.

93. The lighting system in accordance with claim 69, wherein said subassembly comprises an interior rearview mirror and wherein said lighting module comprises a console-illuminating lamp.

94. The lighting system in accordance with claim 69, further comprising another lighting module adapted for attachment to the vehicle including another at least one white light emitting diode, said another at least one white light emitting diode individually emitting substantially white light when electrically powered.

95. The lighting system in accordance with claim 94, wherein said another lighting module is adapted for attachment to one of a door handle assembly, a bumper, a trim element, a luggage-compartment cover, a sunroof-operating module, an engine-compartment cover, a glove compartment, an ashtray, a storage compartment, and a seat of the vehicle.

96. The lighting system in accordance with claim 69, wherein said subassembly comprises an interior rearview mirror and wherein said lighting module comprises a gear-shift lever illuminating lamp.

97. The lighting system in accordance with claim 75, wherein said circuit board comprises a printed circuit board.

98. The lighting system in accordance with claim 69, wherein said subassembly comprises an interior rearview mirror assembly, wherein said interior rearview mirror assembly comprises a mirror housing having a driver side portion and a passenger side portion, said interior rearview mirror assembly further comprising a mirror mount for attachment of said interior rearview mirror assembly to an interior portion of the vehicle and wherein said lighting module radiates light generally downwardly from said interior rearview mirror assembly.

99. The lighting system in accordance with claim 98, wherein said lighting module comprises a driver side lighting assembly included at said driver side portion of said mirror housing.

100. The lighting system in accordance with claim 98, wherein said lighting module comprises a passenger side lighting assembly included at said passenger side portion of said mirror housing.

101. The lighting system in accordance with claim 98, wherein said mirror mount includes said lighting module.

102. A system of claim 98, wherein said lighting module is positioned in a pod attached to said mirror mount.

103. A vehicular lighting system suitable for use in a motor vehicle, the system comprising:

a subassembly of the vehicle, said subassembly comprising an outside mirror assembly;

a lighting module included in said subassembly of the vehicle, said lighting module comprising at least one white light emitting diode;

said subassembly further comprising electrical circuitry for supplying electrical power to said at least one white light emitting diode;

wherein said at least one white light emitting diode individually emits substantially white light when said at least one white light emitting diode is powered by said electrical circuitry;

wherein said lighting module is protected against penetration of moisture; and wherein said lighting module illuminates the entry region adjacent a door of the vehicle when said at least one white light emitting diode is powered by said electrical circuitry.

104. The lighting system in accordance with claim 103, wherein said at least one white light emitting diode comprises at least two white light emitting diodes.

105. The lighting system in accordance with claim 103, wherein said lighting module comprises said at least one white light emitting diode and a second light emitting diode and wherein said at least one white light emitting diode has a first light beam axis and said second light emitting diode has a second light beam axis, said second light beam axis being nonparallel to said first light beam axis.

106. The lighting system in accordance with claim 103, said lighting module further comprising a lens arranged in a beam path of light emitted by said at least one white light emitting diode.

107. The lighting system in accordance with claim 103, wherein said lighting module includes said electrical circuitry and wherein said electrical circuitry and said at least one white light emitting diode are commonly mounted on a circuit element.

108. The lighting system in accordance with claim 107, wherein said circuit element comprises a conductor foil.

109. The lighting system in accordance with claim 107, wherein said circuit element comprises a circuit board.

110. The lighting system in accordance with claim 103, wherein said lighting module is removable from said subassembly of the vehicle.

111. The lighting system in accordance with claim 103, wherein a transparent cover is provided in a beam path of light emitted by said least one first white light emitting diode.

112. The lighting system in accordance with claim 111, wherein said transparent cover has a diode side facing said at least one white light emitting diode, said transparent cover diode side comprising a lens.

113. The lighting system in accordance with claim 111, wherein said transparent cover comprises a plastic material.

114. The lighting system in accordance with claim 103, wherein said lighting module comprises a module housing and a transparent cover and wherein said lighting module housing and said cover are manufactured jointly in a multicomponent injection molding process.

115. The lighting system in accordance with claim 114, further comprising a clip connection connecting said transparent cover to said lighting module housing.

116. The lighting system in accordance with claim 103, wherein said electrical circuitry comprises a non-linear resistance network connected with said at least one white light emitting diode.

117. The lighting system in accordance with claim 103, wherein said electrical circuitry comprises a pulse width modulation circuit connected with said at least one white light emitting diode.

118. The lighting system in accordance with claim 103, wherein said electrical circuitry comprises a diode connected with said at least one white light emitting diode.

119. The lighting system in accordance with claim 103, further comprising: a temperature sensor, said electrical circuitry controlling the current supply to said at least one white light emitting diode as a function of temperature measured by said temperature sensor.

120. The lighting system in accordance with claim 103, further comprising a light-guiding element for said at least one white light emitting diode.

121. The lighting system in accordance with claim 120 wherein said light-guiding element comprises a tube.

122. The lighting system in accordance with claim 103, wherein said lighting module includes said electrical circuitry.

123. The lighting system in accordance with claim 103, wherein said outside mirror assembly includes a mirror element, said mirror element supported on a carrier plate and adjustable by an electrical drive.

124. The lighting system in accordance with claim 103, wherein said outside mirror assembly comprises a fold-away outside mirror assembly.

* * * * *